Jan. 14, 1947.　　　H. C. CHERRY　　　2,414,139
TOASTING MACHINE
Filed June 19, 1943　　　4 Sheets-Sheet 1

Inventor
H. E. CHERRY,
By
Attorney

Jan. 14, 1947.	H. C. CHERRY	2,414,139
TOASTING MACHINE
Filed June 19, 1943	4 Sheets-Sheet 2

Inventor
HENRY E. CHERRY,
By *B.B.Collings*
Attorney

Jan. 14, 1947.                H. C. CHERRY                2,414,139
                             TOASTING MACHINE
                          Filed June 19, 1943            4 Sheets-Sheet 3

Inventor
HENRY E. CHERRY,
By /s/ G.B. Collings
Attorney

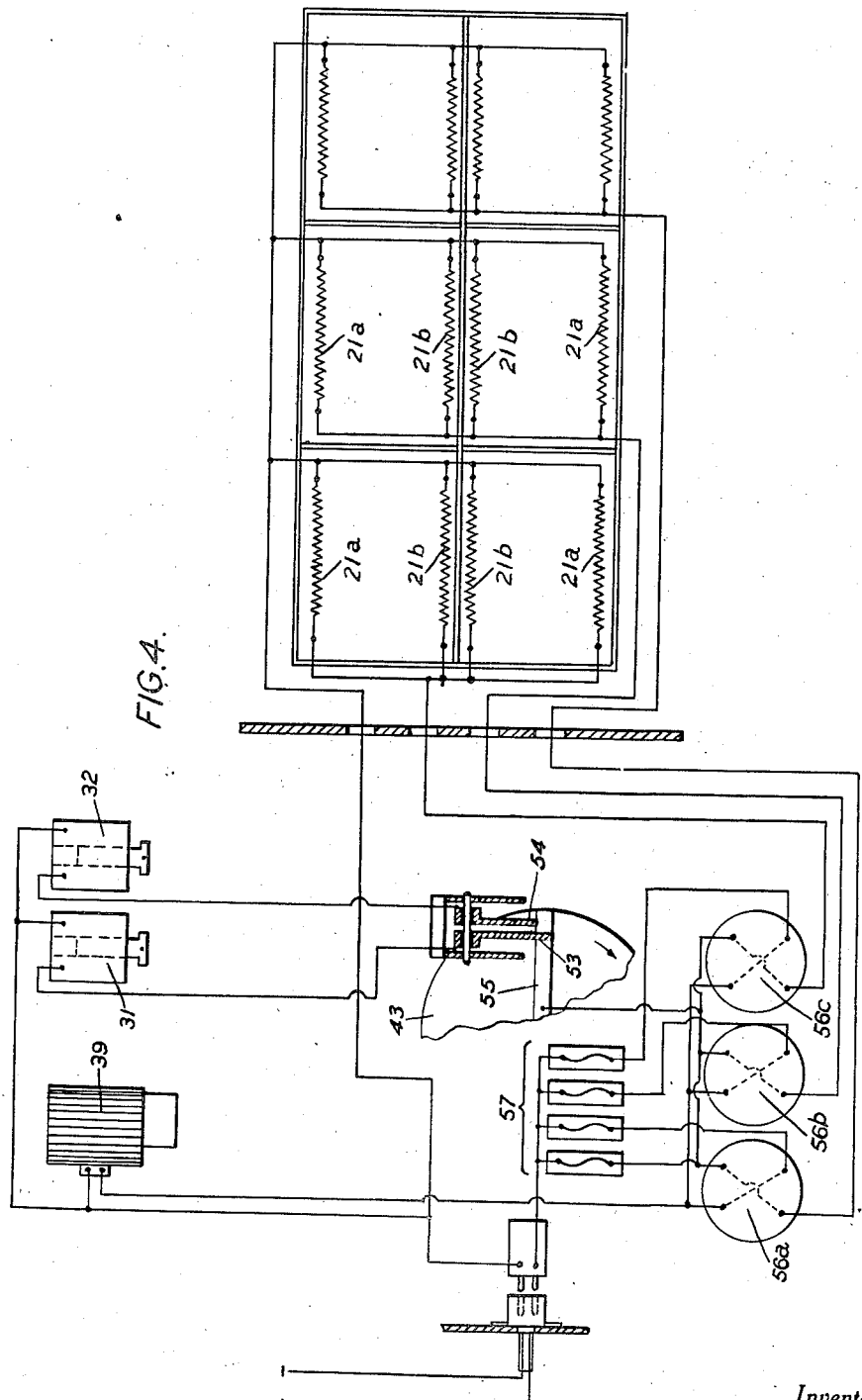

Patented Jan. 14, 1947

2,414,139

UNITED STATES PATENT OFFICE 2,414,139

TOASTING MACHINE

Henry Edward Cherry, Morden, England

Application June 19, 1943, Serial No. 491,541
In Great Britain June 22, 1942

7 Claims. (Cl. 99—334)

This invention relates to machines for toasting sliced bread and the like. The majority of people prefer toast having a soft moist centre with uniformly toasted golden brown exterior surfaces, but some people prefer toast having hard exterior surfaces with a soft moist centre or hard toast throughout the slice, and there are a number of desirable combinations of hardness or softness of the exterior surfaces and centres. The present invention has for its object the production of a machine that will permit these results to be attained.

According to this invention a toasting machine for toasting sliced bread and the like (hereinafter referred to as "bread") comprises a drying station for the reception of a slice of bread and an adjacent toasting station for receiving the slice from the drying station and for toasting it, heating means associated with the toasting station, and timing means for timing the passage of the slice from the drying to the toasting station and its discharge from the latter. Preferably there is a detent for preventing the slice passing from the drying to the toasting station, a detent for preventing the discharge of the slice from the toasting station, and means for releasing said detents.

According to an important feature of the invention the machine comprises two superimposed narrow communicating chambers, the upper one being a drying chamber having a mouth at the top for the edgewise insertion of the slices and the lower one being a toasting chamber having a discharge mouth at the bottom for the edgewise discharge of the toasted slices. Desirably there are two spaced heaters at the toasting station or chamber for receiving the slice between them.

Figure 1:
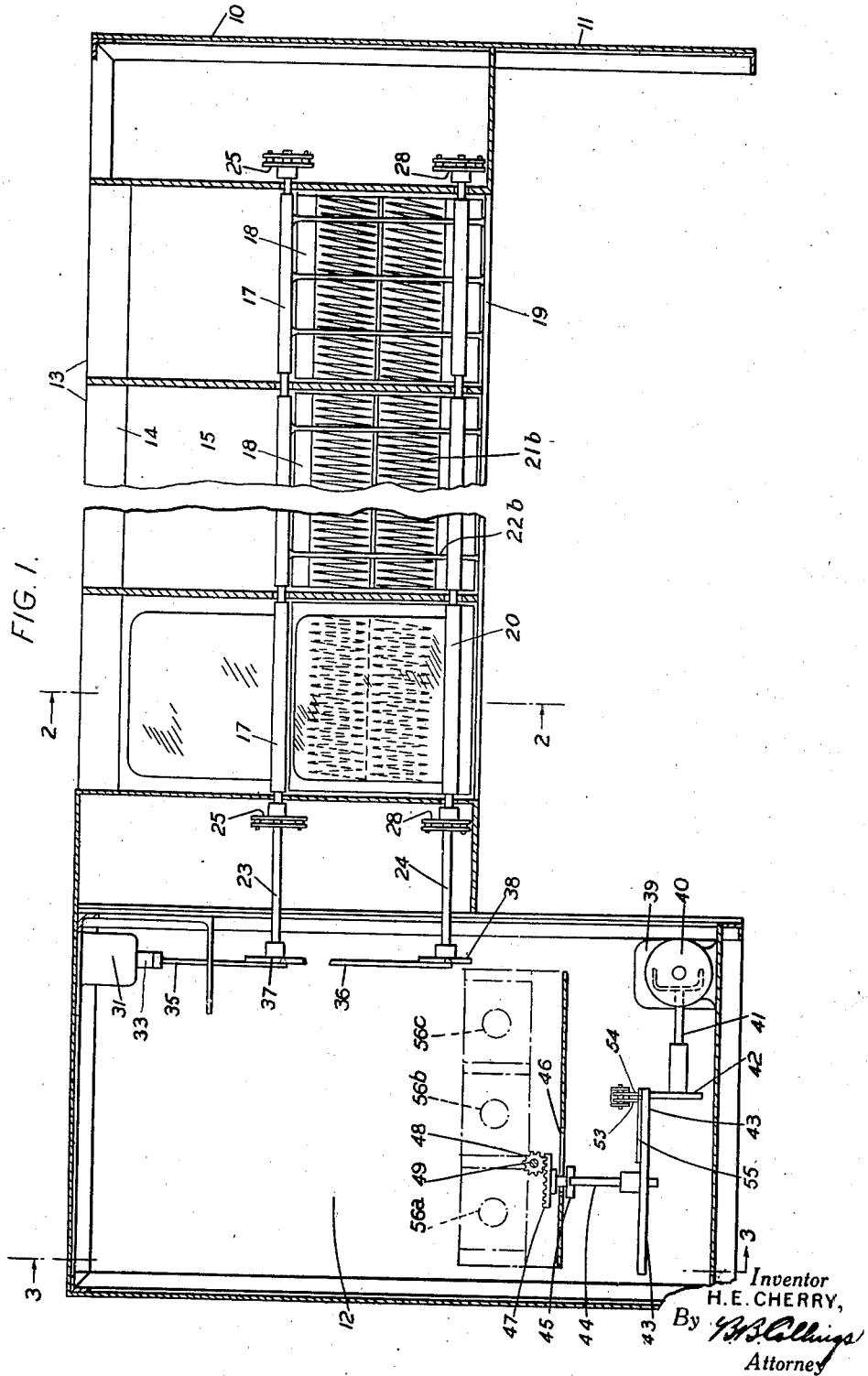
Figure 2:
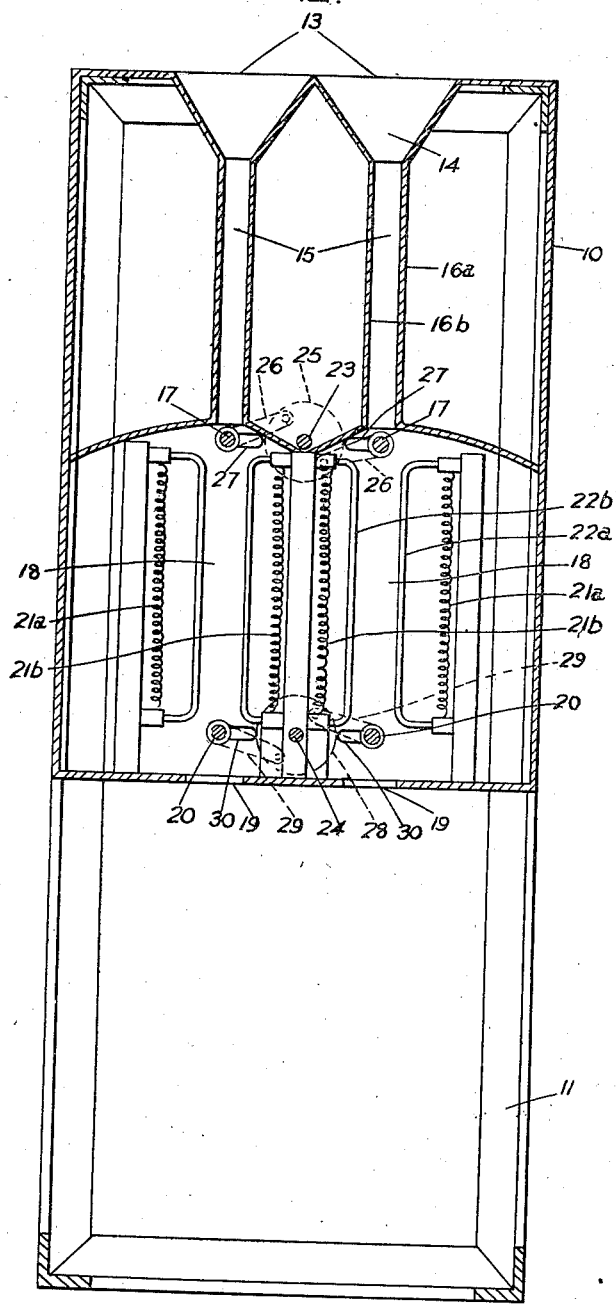
Figure 3:
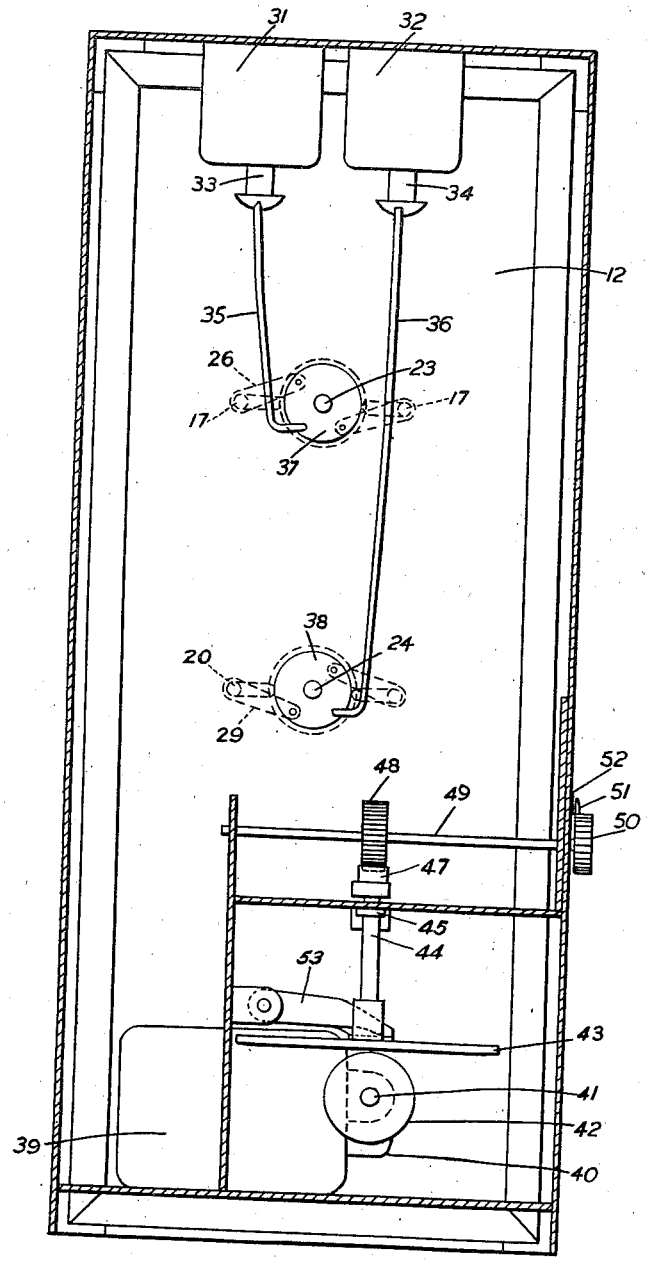

These and other features of the invention set out in the appended claims are incorporated in the toasting machine which will now be described in detail, as an example, with reference to the accompanying drawings, which are to some extent diagrammatic and in which Figure 1 is a longitudinal section through the machine, and Figures 2 and 3 are respectively cross sections taken on the lines 2—2 and 3—3 in Fig. 1, and Figure 4 is a wiring diagram illustrating the electrical circuits.

The machine comprises a box-like structure or casing, indicated generally by the numeral 10, elevated at one end on supports 11 and at the other end on a box-like motor casing 12. The structure 10 has its upper surface pierced with any desired number of rectangular apertures or slots 13 each of which leads by way of a funnel 14 to a drying chamber or station 15 constituted by two side walls 16a, 16b and having a movable detent 17 at its base. The walls 16a, 16b are spaced sufficiently to accommodate a slice of bread in a vertical position between them, said slice normally resting on the detent 17. Each drying chamber 15 opens into a toasting chamber 18 below it, said toasting chamber having a discharge mouth or slot 19 in the underside of the structure 10, which discharge mouth is adapted to be closed by a movable detent 20. At each side of the toasting chamber there is an electric heating unit 21a, 21b, said units being protected by spaced grids 22a, 22b respectively. The space between these grids is such as to accommodate between them in a vertical position a slice of bread resting on the detent 20. Means may be provided whereby the width of the chambers may be varied.

Each detent 17, 20 consists of a laterally movable rod, and timing mechanism hereinafter described is provided for moving said rods laterally at suitable intervals so as to permit the passage of a dried slice of bread from the drying chamber 15 to the toasting chamber 18 and the discharge of a toasted slice from the toasting chamber. In operation a slice of bread is inserted through a mouth 13 into the drying chamber 15 where it is retained for the appropriate predetermined period, whereupon the detent 17 is displaced to permit the dried slice to fall to the toasting chamber 18 to take the place of a toasted slice discharged therefrom upon displacement of the lower detent 20.

Conveniently a pair of drying chambers 15 and a pair of toasting chambers 18 are located side by side as shown in Fig. 2, and the two upper detents 17 are moved towards each other simultaneously, as are also the two lower detents 20. For this purpose upper and lower shafts 23, 24 extend lengthwise of the structure 10. At each end the shaft 23 carries a crank disc 25 connected by links 26 one to each detent 17. It will be seen that by rotating said shaft 23 the detents 17 may be simultaneously moved towards and away from each other along slots 27 out of and into operative position. The shaft 24 is similarly provided with crank discs 28 connected by links 29 to the rods 20 so as to move the latter along slots 30.

The shafts 23, 24 are rotated by electro-magnetic means the energisation of which may readily be timed as required. It has been elected to illustrate the said means as comprising solenoids 31, 32 in the motor compartment 12, the plungers 33, 34 of which are respectively connected by rods 35, 36 to crank discs 37, 38 secured within the said compartment 12 to the ends of the shafts 23, 24. The variable switching mechanism for energising the solenoids 31, 32 is conveniently driven through variable speed gearing from a motor here shown as an electric motor 39. The said motor drives (through gearing indicated at 40) a horizontal shaft 41 carrying a friction disc 42, the periphery of which engages the undersurface of a second friction disc 43 rotatably mounted on a substantially vertical shaft 44, and means is provided for varying the gear ratio by varying the point of contact between the two discs. For this purpose shaft 44 depends from a slider 45 movable along guides 46 by engagement between a rack 47 on said slider and a pinion 48 on a spindle 49 having a knob 50 at the outside of the motor compartment. The said knob may be provided with a pointer 51 co-operating with a suitably inscribed scale 52.

The switching mechanism for the solenoids further comprises a pair of pivoted contact arms 53, 54 adapted to be engaged by a radial contact 55 carried on the disc 43. It will be noted from Fig. 4 that the contact arm 54 is shorter than the arm 53 so that, assuming rotation of the disc 43 in a clockwise direction as indicated by the arrow, the contact strip 55 will engage the arm 54 somewhat in advance of its engagement with the arm 53. Thus the solenoid 32 will be energized in advance of the solenoid 31, and the detents 20 moved to release slices of toast from the chambers 18 before the detents 17 release the slices of bread from the drying chambers 15. It will also be understood that there is a substantial gap between the bottom edge of a slice standing in a drying chamber 15 and the top edge of a slice in the toasting chamber 18 beneath it so that, coupled with the sequential actuation of the detents 20 and 17, ample opportunity is afforded for the detent 20 to return to arresting position before the slice from the upper chamber drops through the lower chamber. It will futher be understood that, according to the gear ratio selected, the time-interval elapsing between successive engagements of the contact 55 with the contact arms 53, 54 may be varied and so the time that a slice of bread remains in either chamber may be varied.

It will be appreciated that any desired number of pairs of chambers may be provided lengthwise of the structure 10 as is clearly illustrated in Fig. 1, each detent being common to a plurality of chambers. The appropriate number of switches, indicated diagrammatically at 56a, 56b and 56c may be provided for bringing into operation the required toasting elements. These switches may be for example, of a known double pole type whereby, when closed, their respective contacts will be interconnected as indicated in dotted lines in Fig. 4. Conveniently the connections which may include fuses 57 are such that when the required toasting elements are brought into operation the motor 39 is energized.

I claim:

1. A toasting machine for toasting sliced bread and the like, comprising two superimposed narrow communicating chambers, the upper one of which is a drying chamber having a mouth at the top for the edgewise insertion of the slice and the lower one of which is a toasting chamber having a discharge mouth at the bottom for the edgewise discharge of the toasted slice, two spaced heaters at the toasting chamber for receiving between them the slice from the drying chamber, releasable means for arresting a slice in a stationary attitude in each of said chambers and timing means for timing the passage of the slice from the drying to the toasting chamber and its discharge from the latter.

2. A toasting machine for toasting sliced bread or the like, comprising a drying chamber having a mouth at the top for the edgewise insertion of a slice to be dried and toasted, a toasting chamber below the drying chamber for receiving the slice from it, a discharge mouth for the edgewise discharge of the slice from the toasting chamber, two spaced electric heaters at the toasting chamber for receiving the slice between them, releasable detents for preventing the passage of the slice from the drying to the toasting chamber and its discharge from the latter, and a motor for releasing said detents.

3. A toasting machine for toasting slices of bread and the like, comprising a casing enclosing a plurality of narrow drying chambers for receiving the slices on edge one at a time, and a plurality of narrow toasting chambers, one below each drying chamber, and communicating therewith to receive a slice from it; mouths at the top of the casing for the edgewise insertion of the slices into the drying chambers; discharge mouths at the bottom of the casing for the edgewise discharge of the toasted slices from the toasting chambers; electric heating means, at each side of each toasting chamber, for the reception of a slice therebetween; releasable means for preventing the passage of the slices from the drying chambers to the toasting chambers and their discharge from the latter; and timing apparatus for releasing said means.

4. A toasting machine for toasting sliced bread and the like, comprising two superimposed interconnecting chambers, the upper one of which is a drying chamber for receiving a stationary slice for drying preparatory to toasting and having a mouth at the top for the edgewise insertion of the slice, and the lower one of which is a toasting chamber for receiving a dried slice from the drying chamber and having a discharge mouth at the bottom for the edgewise discharge of the toasted slice, heating means associated with the toasting chamber, releasable detents for retaining a slice in the drying chamber and a slice in the toasting chamber, and timing and operating means for releasing the detents and for timing the exit of the slice from the drying to the toasting chamber and the exit of the slice from the toasting chamber.

5. A toasting machine for toasting sliced bread and the like, comprising a plurality of pairs of superimposed narrow connecting chambers side by side the upper one of each of which pairs is a drying chamber for holding a stationary slice for drying preparatory to toasting and has a mouth at the top for the edgewise insertion of the slice, and the lower one of which is a toasting chamber for receiving the slice from the drying chamber and has a discharge mouth at its base for the edgewise discharge of the toasted slice, heating means associated with the toasting chambers, releasable detents for preventing the passage of a slice from each drying chamber to the associated toasting chamber and the discharge of the toasted slice from the latter, and means for operating the detents of all said drying chambers and common means for operating the detents of all said toasting chambers.

6. A toasting machine for toasting sliced bread and the like, comprising two superimposed narrow connecting chambers, the upper one of which is a drying chamber for holding a stationary slice for drying preparatory to toasting and has a mouth at the top for the edgewise insertion of the slice, and the lower one of which is a toasting chamber for receiving the slice from the drying chamber and has a discharge mouth at its base for the edgewise discharge of the toasted slice, heating means associated with the toasting chamber, releasable means for retaining the slices in the chambers, and operating means comprising an electro-magnetic device for operating said means, a circuit for supplying current thereto, a switch controlling said circuit, variable speed gearing for operating said switch, and a motor for driving said gearing.

7. A toasting machine for toasting sliced bread and the like, comprising two superimposed interconnecting chambers, the upper one of which is a drying chamber for holding a stationary slice for drying preparatory to toasting, and has a mouth at the top for the edgewise insertion of the slices, and the lower one of which is a toasting chamber for receiving a dried slice from the drying chamber and has a discharge mouth at the bottom for the edgewise discharge of the toasted slice, heating means associated with the toasting chamber for toasting the slice therein, a member extending lengthwise of the base of each chamber to support the slices therein, and means for moving said members sideways to permit the slices to fall.

HENRY EDWARD CHERRY.